(12) United States Patent
Gerecke et al.

(10) Patent No.: US 9,187,121 B2
(45) Date of Patent: Nov. 17, 2015

(54) VEHICLE STABILIZATION DEVICE AND METHOD

(75) Inventors: Marc Gerecke, Hannover (DE); Heiko Kopper, Wunstorf (DE); Arne Michaelsen, Seelze (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/362,769

(22) PCT Filed: Sep. 7, 2012

(86) PCT No.: PCT/EP2012/003754
§ 371 (c)(1),
(2), (4) Date: Aug. 20, 2014

(87) PCT Pub. No.: WO2013/083208
PCT Pub. Date: Jun. 13, 2013

(65) Prior Publication Data
US 2014/0365078 A1      Dec. 11, 2014

(30) Foreign Application Priority Data
Dec. 9, 2011  (DE) .......................... 10 2011 120 667

(51) Int. Cl.
| | |
|---|---|
| *B62D 6/00* | (2006.01) |
| *B62D 7/15* | (2006.01) |
| *B62D 6/04* | (2006.01) |
| *B60T 8/1755* | (2006.01) |

(52) U.S. Cl.
CPC ............. *B62D 6/003* (2013.01); *B60T 8/17554* (2013.01); *B62D 6/04* (2013.01); *B62D 7/159* (2013.01); *B60T 2260/02* (2013.01)

(58) Field of Classification Search
CPC .......... B62D 7/159; B62D 6/04; B62D 6/003; B60T 2260/02; B60T 8/17554
See application file for complete search history.

(56) References Cited

U.S. PATENT DOCUMENTS

| | | | |
|---|---|---|---|
| 7,164,980 B1 | 1/2007 | Doll et al. | |
| 2002/0143451 A1 | 10/2002 | Hac et al. | |
| 2003/0055549 A1* | 3/2003 | Barta et al. | ....................... 701/70 |

FOREIGN PATENT DOCUMENTS

| | | | |
|---|---|---|---|
| DE | 40 31 317 A1 | 4/1992 | |
| DE | 44 19 131 A1 | 12/1994 | |
| DE | 199 18 597 A1 | 11/2000 | |
| DE | 102 08 418 A1 | 10/2002 | |

(Continued)

*Primary Examiner* — Mary Cheung
*Assistant Examiner* — Yuen Wong
(74) *Attorney, Agent, or Firm* — Kramer Levin Naftalis & Frankel LLP

(57) ABSTRACT

For stabilizing a vehicle, a steering angle of at least one steered front axle and/or additional axle is changed by automatic forced steering Additional drive stabilization is achievable by initiating an adjustment of a changed steering angle of the steered front axle and/or additional axle in response to a tilting tendency of the vehicle recognized via a tilt-stability control device as above a tilt limit, in addition to initiating a vehicle delay for reducing this tilting tendency. This counteracts an understeering or oversteering influence of the vehicle delay Additionally or alternatively, additional drive stabilization is achievable by determining the direction of movement in the wheel contact point of an additional axle wheel on the steered additional axle relative to the vehicle's longitudinal axis and adjusting the steering angle of the steered additional axle based thereon to reduce the drift angle of the additional axle wheel relative to its direction of movement.

10 Claims, 8 Drawing Sheets

(56) References Cited

FOREIGN PATENT DOCUMENTS

| DE | 602 02 086 T2 | 1/2005 |
| DE | 103 60 404 A1 | 7/2005 |
| DE | 10 2004 046 890 A1 | 3/2006 |
| DE | 10 2007 038 575 A1 | 2/2009 |
| EP | 2 025 578 A1 | 2/2009 |
| GB | 2 453 024 A | 3/2009 |
| WO | WO 2005/047086 A1 | 5/2005 |

* cited by examiner

VEHICLE STABILIZATION DEVICE AND METHOD

FIELD OF THE INVENTION

The present invention generally relates to vehicle stabilization.

BACKGROUND OF THE INVENTION

Vehicles can comprise electronically steered axles, wherein either a steering angle is fully electronically adjusted or a steering angle adjusted by a driver by means of a steering wheel is superimposed with an additional steering angle. It is known to change a steering angle of the steered axle by electronic steering of the axle in order to thereby stabilize the vehicle.

A method for adjusting a steering angle of an electronically steered axle of a commercial vehicle is described in Applicant's DE 10 2007 038 575 A1, wherein the steering angle of the electronically steered axle is changed on detecting an unstable drive state. In particular, the electronically steered axle is a trailing axle, whose steering angle is increased in the case of a tendency to understeer and is reduced in the case of a tendency to oversteer. In addition, braking interventions can be provided.

A method and a device for regulating the drive dynamics of a vehicle are described in WO 2005/047086 A1, wherein steering interventions are carried out on the front axle and/or on the rear axle of the vehicle that counteract understeer or oversteer. The steering interventions can be combined with conventional braking and engine interventions of an ESP (Electronic Stability Program) system.

SUMMARY OF THE INVENTION

Generally speaking, it is an object of the present invention to improve over prior art vehicle stabilization approaches with the use of steering interventions.

With the drive stabilization method according to various embodiments of the present invention, to stabilize a vehicle, especially a commercial vehicle, a steering angle of at least one steered front axle and/or additional axle of the vehicle can be changed relative to the longitudinal axis of the vehicle by automatic forced steering or electronically controlled steering or autonomous steering of the axle. A drive stabilization device according to an embodiment of the present invention is accordingly designed to stabilize the vehicle by changing the steering angle of the steered front axle and/or additional axle of the vehicle relative to the longitudinal axis of the vehicle by electronic steering of the axle.

According to a first embodiment, in response to a tilt inclination of the vehicle (or in other words, a tendency of the vehicle to tilt) detected by means of a tilt stabilization control device as being in excess of a tilt limit angle, in addition to causing a deceleration of the vehicle for reducing the tilt inclination, an adjustment is caused of a changed, especially increased or reduced, steering angle or an increase or reduction of the steering angle of the steered front axle and/or additional axle is caused in order to counteract an influence of the vehicle deceleration acting on the vehicle and causing understeer or oversteer. The steering angle is thereby changed or increased or reduced compared to a steering angle that would have been adjusted without a deceleration of the vehicle caused by the tilt stabilizing device, especially compared to a driver demand by means of a steering wheel of the vehicle.

The drive stabilization device for this embodiment comprises a track keeping device that increases or reduces the steering angle of the steered front axle and/or additional axle in order to counteract an influence on the vehicle of the deceleration of the vehicle causing understeer or oversteer, which causes a reduction of a tilt inclination detected by means of the tilt stability control device as being in excess of the tilt limit angle of the vehicle.

The tilt stability control device, which can be a so-called Roll Stability Control (RSC) controller, counteracts a possible tilting or rollover of the vehicle in that the speed of the vehicle is preventively reduced. In particular, the vehicle is braked, wherein when traversing a turn a braking effect on the wheels on the outside of the turn is higher than a braking effect on the wheels on the inside of the turn. This often results in a torque opposing turning of the vehicle or the influence on the vehicle causing understeer. The torque or the influence causing understeer is compensated for by the increase of the steering angle of the steered front axle and/the additional axle, so that the driver of the vehicle does not have to manually turn the steering more in order to maintain the track radius and in order to not he carried out of the turn. Alternatively, an influence acting on the vehicle that causes oversteer, especially breaking away of the rear of the vehicle, can also arise as a result of braking in a turn, e.g., because of tire properties, which can also be automatically compensated for, in this case by gentler turning in or a reduction of the steering angle. The comfort and safety in the event of an intervention by the tilt stability control device are increased by means of these compensations.

Alternatively or additionally to the first embodiment, in a second embodiment, the direction of motion at the wheel contact point of a wheel of an additional axle disposed on the steered additional axle relative to the longitudinal axis of the vehicle is determined, by measurement or estimation or computation, and the steering angle of the steered additional axle is adjusted depending on the respectively determined direction of motion in order to reduce a drift angle of the wheel of the additional axle relative to its direction of motion.

For this second embodiment, the drive stabilization device comprises an estimation device for determining the direction of motion at the wheel contact point of the additional axle wheel disposed on the steered additional axle relative to the longitudinal axis of the vehicle. Determination by means of the estimation device is also to be understood to include a measurement and/or computation, wherein, e.g., a plurality of known, assumed, set and/or measured variables that characterize the drive state of the vehicle and/or the vehicle state and/or the state of the road are processed. In particular, the variables are read out of a memory and/or directly provided by sensors and are processed by a processor according to specified computation instructions. The determined drift angle can thus be a measured drift angle that is especially measured by means of a sensor or by means of a plurality of sensors.

For this embodiment, the drive stabilization device also comprises a drift angle reduction device tor adjusting the steering angle of the steered additional axle depending on the respectively determined direction of motion, in order to reduce the drift angle of the additional axle wheel relative to its direction of motion.

According to the second embodiment, there is thus no attempt to reduce the understeer or oversteer by means of the cornering forces of the additional axle wheel, which would result in a greater drift angle. Instead, the drift angle is reduced. This recognizes that a greater braking force can be transferred by a wheel if the drift angle of the wheel is very small. The vehicle can thus be more effectively braked on individual wheels for vehicle stabilization or even on all wheels, whereby understeer or oversteer is counteracted by means of the braking. In particular, with oversteer, the rear of the vehicle with the steered additional axle can break out so much that the drift angle cannot be restored to zero even with a great deal of turn-in of the additional axle. However, the drift angle can be reduced so much that a relatively greater braking force can be transferred. The vehicle can thereby be controlled better and can be returned to its track better, because, on the one hand, cornering forces can have a better effect, and, on the other hand, braking force can be transferred better.

Preferably, first and second embodiments are combined, so that overall stable drive behavior for the vehicle results, even if the vehicle is strongly understeering, strongly oversteering or the tilt stability control device or RSC regulation is intervening. The intervention in the drive behavior of the vehicle is effective in each case and thus enhances the safety of the vehicle. Furthermore, the intervention is smooth, resulting in an increase in comfort. Finally, the intervention is of low wear overall and thus also advantageous from an economy viewpoint.

According to an embodiment, the track radius with which the vehicle is moving about a point of rotation, even in the case of deceleration of the vehicle and changing of the steering angle caused by the tilt stability control device, essentially corresponds to a demand applied via the steering wheel of the vehicle. Preferably, the track radius with which the vehicle moves about the point of rotation or through the respective turn remains essentially the same, even being unaffected by the intervention of the tilt stability control device, especially immediately before and immediately after the deceleration of the vehicle and the change of the steering angle caused by the tilt stability control device. The influence of the deceleration of the vehicle is thus compensated for by the change of the steering angle such that the driver of the vehicle does not have to respond to the intervention by the tilt stability control device with a change of the steering angle by means of the steering wheel. The track keeping device uses a determined yaw rate, the steering angle of the steering wheel and possibly data or signals of other sensors in order to compute the steering angle by means of sensed values or to select it from a table.

Preferably, a change of the turn radius of the vehicle during an intervention by the tilt stability control device is sensed or is determined, especially from the yaw rate and the speed of the vehicle. In the case of a detected deviation, the steering angle is changed accordingly, so that the turn radius is essentially maintained or is changed only by manual steering interventions of the driver.

Alternatively or in addition, the current braking pressure, especially a pneumatic or hydraulic pressure of at least one brake of the vehicle, is measured and analyzed. Using the braking pressure, the drive stabilization device thus predicts an impending deceleration of the vehicle and thus a tendency to understeer or a tendency to oversteer of the vehicle in good time, even before the deceleration of the vehicle or tendency to understeer or tendency to oversteer occurs. The steering angle is changed in response to the predicted tendency to understeer or tendency to oversteer, so that an actual understeer or oversteer does not occur or at least occurs only in a highly attenuated manner.

According to an embodiment of the inventive drive stabilization method, in order to cause the deceleration of the vehicle, at least one brake, especially a wheel brake, of the vehicle Is operated. The drive stabilization device preferably comprises a brake operating device for operating the brake to cause the deceleration of the vehicle. This enables the vehicle to be braked rapidly and in a controlled manner on individual, multiple or all wheels, wherein the braking force can be very accurately regulated. Alternatively or in addition, the vehicle can be braked or decelerated during an intervention by the tilt stability control device by throttling back the engine and/or by the use of a retarder.

According to another embodiment of the drive stabilization method, an understeer of the vehicle greater than a specified understeer limit value, and consequently a strong understeer of the vehicle, and a mentioned oversteer of the vehicle above a specified oversteer limit value, and consequently a strong oversteer of the vehicle, are detected. Furthermore, in the case of detected strong understeer or strong oversteer, in addition, at least one braking intervention is activated on the additional axle wheel of the steered additional axle. The drive stabilization device accordingly comprises a track deviation detector for detecting strong understeer or strong oversteer. The drive stabilization device also comprises a braking intervention device for activating the braking intervention in the case of the detected strong understeer or strong oversteer. In particular, the braking intervention device can activate the braking intervention only if the strong understeer or oversteer has been detected.

Thus, a slight understeer or oversteer can be compensated for by steering interventions on the additional axle without braking interventions being necessary. With strong understeer or oversteer, in contrast to the steering interventions, braking interventions are extended, wherein the braking interventions can take place very effectively because of the reduction of the drift angle.

According to an embodiment of the inventive drive stabilization method, the steering angle of the steered additional axle is adjusted depending on the determined direction of motion in order reduce the drift angle of the additional axle only in the case of the detected strong understeer or strong oversteer. The drift angle reduction device of the drive stabilization device is configured accordingly. Thus with slight understeer or slight oversteer, the drift angle is not reduced, but there is a direct attempt to counteract the understeer or oversteer by means of the steering interventions so that no braking interventions are necessary.

The drive stabilization device comprises control electronics with a computer, especially a data processor, and possibly memory.

The vehicle is a motor vehicle with an engine, especially an internal combustion engine. The vehicle comprises at least one steerable front axle and/or at least one steerable additional axle, The vehicle further comprises the inventive drive stabilization device.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is discussed in greater detail below with reference to the accompanying drawings, in which.

LIST OF REFERENCE CHARACTERS

Figure 1:
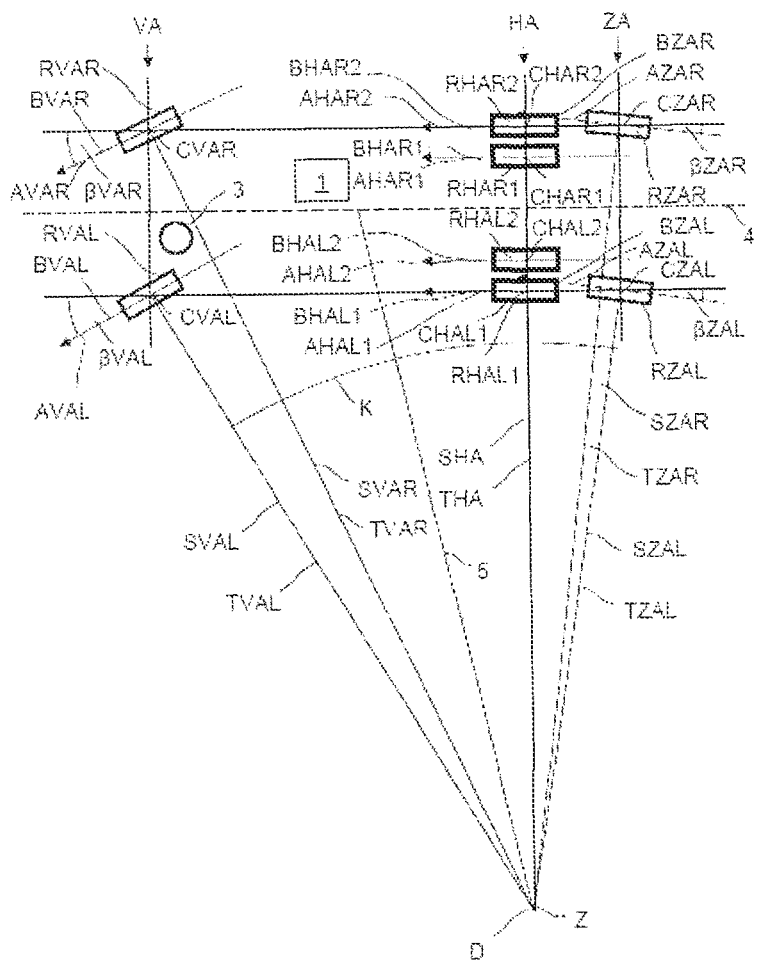
FIG. 1 shows a drive stabilization device in a vehicle according to an exemplary embodiment of the invention for slow travel round a turn, essentially without wheel slip.

R wheel
RVAL left front axle wheel
RVAR right front axle wheel
VA front axle
RHAL1 left rear axle wheel
RHAL2 further left rear axle wheel
RHAR1 right rear axle wheel
RHAR2 further right rear axle wheel
HA rear axle
RZAL left additional axle wheel
RZAR right additional axle wheel
ZA additional axle
C wheel contact point
CVAL (etc) wheel contact point of the left front wheel
D, D', D'', D''', D'''' point of rotation
M center of gravity of the vehicle
S line between wheel contact point and point of rotation
SVAL line between left front axle wheel and point of rotation
B direction of motion
BVAL direction of motion of the left front axle wheel
T extension of the axis of rotation of a wheel
TVAL extension of the axis of rotation of the left front wheel
Z central point
A longitudinal direction
AVAL longitudinal direction of the left front axle wheel
α drift angle
αVAL drift angle of the left front axle wheel
β steering angle
βVAL steering angle of the left front axle wheel
K arc of a circle
$G_{tilt}$ tilt limit angle
$G_{under}$ understeer limit value
$G_{over}$ oversteer limit value
1 drive stabilization device
2 vehicle
3 steering wheel
4 longitudinal axis of the vehicle
5 track radius
6 tilt stability control device/RSC
7 yaw regulation control device
8 control device
10 track deviation detector/track deviation predictor
12 track keeping device
14 brake operating device
16 estimation device
18 drift angle reduction device
20 direction of travel deviation detector
21 brake control block
22 braking intervention device
23 vehicle brakes
23a sensor
24 first drive stabilization method
24' second drive stabilization method
26 start of the first drive stabilization method
27 track radius command
28 query: tilt stability control device active?
30 end of the first drive stabilization method
32 sensing data that characterizes the state of the vehicle or the drive state of the vehicle
34 tilt stabilizing device determines tilt inclination
36 query: tilt inclination in excess of limit value?
38 causing a deceleration of the vehicle
40 changing the steering angle on the front axle
42 changing the steering angle on the additional axle
44 operating the wheel brakes
46 throttling hack
48 adjusting a changed steering angle on the front axle
50 adjusting a changed steering angle on the additional axle
52 influence on the vehicle causing understeer or oversteer
54 counteracting understeer or oversteer
56 stabilizing the vehicle
60 track radius is maintained
62 start of the second drive stabilization method
64 query: drive stabilization device active?
66 end of the second drive stabilization method
68 estimating the direction of motion
70 estimating the drift angle
72 query: is vehicle understeering?
74 query: is vehicle oversteering?
76 query: strong understeer?
78 query: strong oversteer?
80 adjusting an increased steering angle
82 adjusting a reduced steering angle
84 change the steering angle of the additional axle
86 adjust steering angle according to direction of motion
88 drift angle is reduced
90 braking intervention activation
92 vehicle is stabilized
94 braking intervention deactivation
96 circle illustrating wheels RVAL with longitudinal direction AVAL
98 circle illustrating wheels RZAL with longitudinal direction AZAL
100 arrow illustrating anticlockwise rotation or a further turn-in of the left front wheel RVAL
102 arrow illustrating clockwise rotation or a further turn-in of the additional axle wheel RZAL

DETAILED DESCRIPTION OF THE PREFERRED EMBODIMENTS

FIG. 1 shows a drive stabilization device 1 in a vehicle 2 according to an exemplary embodiment of the invention.

Besides the drive stabilization device 1 and a steering wheel 3 of the vehicle 2, only its wheels R are illustrated, namely, a left front axle wheel RVAL and a right front axle wheel RVAR of a front axle VA of the vehicle 2, left rear axle wheels RHAL1 and RHAL2 and right rear axle wheels RHAR1 and RHAR2 of a rear axle HA of the vehicle 2 as well as a left additional axle wheel RZAL and a right additional axle wheel RZAR of an additional axle ZA of the vehicle 2, The wheels RVAL and RVAR of the front axle VA are also referred to as RVA, the wheels RHAL1, RHAL2, RHAR1 and RHAR2 of the rear axle are also referred to as RHA and the wheels RZAL and RZAR of the additional axle ZA are also referred to as RZA.

The left wheels RVAL, RHAL1, RHAL2 and RZAL are disposed on the left in relation to the direction of travel of the vehicle 2, and the right wheels RVAR, RHAR1, RHAR2 and RZAR are disposed on the right of a longitudinal axis 4 of the vehicle 2.

The vehicle 2 is shown traveling round a turn, which can be interpreted as a rotation of the vehicle 2 about a point of rotation D. The wheels R are each thereby at a constant distance from the point of rotation D. The vehicle 2 is moving along a curved path with a constant track radius 5. The track radius 5 is the distance between a point on the vehicle, preferably a point located on the longitudinal axis of the vehicle 4, especially the center of gravity of the vehicle, and the point of rotation D. Imaginary lines S between the wheel contact points C of the wheels R and the point of rotation D are each perpendicular to the directions of movement B of the wheels R at the wheel contact point C of the respective wheel R. The lines S are, according to the respective wheel R, referred to with a prefixed S instead of the prefixed R, e.g., with SVAL for the line between the wheel contact point CVAL of the wheel RVAL and the point of rotation D. Reference terms for a plurality of lines S or for the individual lines S and other reference terms, which are yet to be introduced, related to the wheels R are formed analogously to the reference terms of the wheels R.

A special case is illustrated in FIG. 1, which practically only occurs during very slow travel of the vehicle 2, namely, wherein the wheels R essentially have no slip. That is, the orientation or direction of rotation A of the wheels R perpendicular to its respective axis of rotation is essentially coincident with its direction of motion B. The axes of rotation of all wheels R are oriented to a common central point Z, which owing to the absence of drift angle and the resulting coincidence of extensions T of the axes of rotation of the wheels R with the lines S, results in the point of rotation D and the central point Z being coincident. The vehicle 2 maintains a constant distance from an arc K of a circle about the point of rotation D as it travels.

Steering angles βVA on the front axle VA can thereby be demanded by a driver of the vehicle 2 by means of the steering wheel 3. The rear axle HA is a fixed drive axle, wherein the direction of rotation or longitudinal direction AHA of the wheels RAH runs parallel to the longitudinal axis of the vehicle 4. The additional axle ZA can, in principle, be disposed at any point on the vehicle and can e.g., be a leading axle or a trailing axle, especially relative to the rear axle HA. The extensions of the axles of all wheels R can meet at a common central point Z. Alternatively, the wheels RZA of the additional axle ZA can also be turned more strongly, less strongly or not at all. The steering angle βZA of the additional axle ZA can be dependent on the steering angle βVA of the front axle VA solely or among other things or can be independent thereof.

In the exemplary embodiment shown, the additional axle ZA is a trailing axle, wherein the longitudinal direction AZA of the respective additional axle wheel RZA is automatically adjusted depending on the longitudinal direction AVA of the front axle wheels RVA such that the extensions of the axles of all wheels R meet at the common central point Z as standard or without further interventions of a drive dynamics regulator.

Figure 2:
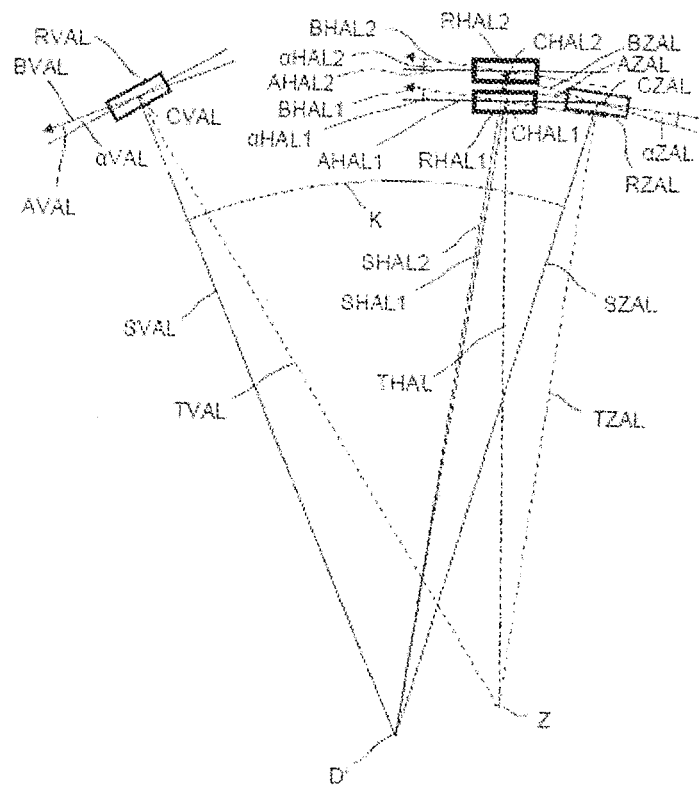
FIG. 2 shows wheels on the left side of the vehicle of the exemplary embodiment according to FIG. 1 with wheel slip during neutral drive behavior.

FIG. 2 illustrates the movement of the vehicle 2 of the first exemplary embodiment of FIG. 1 in the case of wheel slip of wheels R, wherein here, as also in the following figures, only the wheels RVAL, RHAL and RZAL on the left side of the vehicle 2 are illustrated. The results are the same for the wheels RVAR, RHAR and RZAR on the right side of the vehicle 2.

It is assumed that the vehicle 2 is moving round the turn with relatively greater speed compared to the illustration in FIG. 1. Drift angles α thereby occur between the longitudinal direction A and the direction of motion B of a respective wheel R. It is further assumed that the vehicle 2 is neutrally configured or inclines neither to understeer nor to oversteer. In this case, the drift angle αVAL on the left front wheel RVAL is essentially identical to the drift angles αHAL1, αHAL2 and αZAL on the wheels RHAL1, RHAL2 and RZAL of the rear axle HA or additional axle ZA of the vehicle 2. A point of rotation D', about which the vehicle 2 turns, therefore does not coincide with the central point Z, but is essentially at the same distance from a center of gravity of the vehicle 2 as the central point Z. The neutral drive behavior or a drive behavior causing slight understeer is in general the aim for a vehicle. The drive behavior is primarily achieved by a suitably selected load distribution on the vehicle 2.

Figure 3:
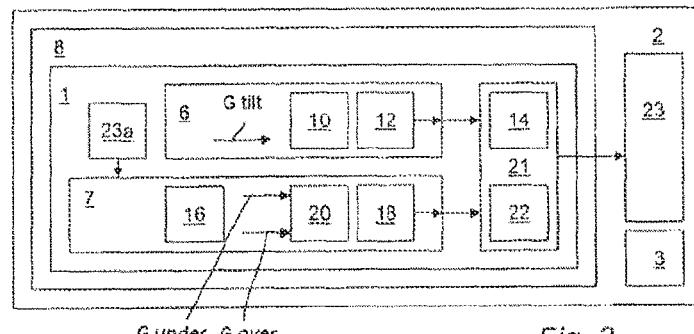
FIG. 3 is a block diagram showing the drive stabilization device of FIG. 1.

FIG. 3 is a black box diagram showing the drive stabilization device 1 of the exemplary embodiment according to FIG. 3. The drive stabilization device 1 comprises a tilt stability control device 6 and a yaw regulation control device 7. A control device 8 provides suitable functionality, e.g., by means of a processor for computing and by means of memory. The control device 8 is also disposed in the vehicle 2.

The yaw regulation control device 7 performs yaw control and thus counteracts skidding of vehicle 2. The tilt stability control device 6 performs tilt stability control and thereby counteracts tilting of the vehicle 2 about its longitudinal axis 4 or rollover of the vehicle 2. The drive stabilization device 1 carries out the drive stabilization method according to the invention depending on data or control signals, in particular changing the steering angle β on the front axle VA and/or on the additional axle ZA if braking of the vehicle 2 is caused by means of the tilt stability control device 6.

The drive stabilization device 1 also comprises a track deviation detector or track deviation predictor 10, a track keeping device 12, a brake operating device 14, an estimation device 16, a drift angle reduction device 18, a direction of travel deviation detector 20, and a braking intervention device 22, which is disposed together with the brake operating device 14 in a brake control block 21. The brake operating device 14 operate brakes 23 of the vehicle 2 in order to decelerate the vehicle 2 and, by means of the resulting lower speed, to reduce the tilt inclination of the vehicle 2 when traveling round a turn or during an evasive maneuver with the steering wheel 3 on full lock if a detected tilt inclination exceeds a tilt limit angle $G_{tilt}$.

The track deviation detector or track deviation predictor 10 can comprise sensors and algorithms that estimate the actual direction of travel of the vehicle and calculate the side slip angle. It detects a tendency of the vehicle to understeer or oversteer and/or predicts the immediately impending occurrence of an understeer or oversteer, e.g., using a sensed braking pressure or using control signals controlling the brake 23. In response thereto, the track keeping device 12, which can comprise a control algorithm and hardware, also changes the steering turn-in or the steering angle βVA on the front axle VA and possibly the steering angle βZA on the additional axle ZA of the vehicle 2, in order to essentially maintain the track. In particular, compared to a steering angle βZA, which would have been set without a detected tendency to understeer or tendency to oversteer tor an otherwise identical state of the vehicle or drive state, e.g., compared to a steering angle βZA demanded by the position of the steering wheel 3, an increased steering angle βZA is set on the additional axle ZA to compensate a tendency to understeer and a reduced steering angle βZA is set on the additional axle ZA to compensate a tendency to oversteer.

The estimation device 16 can comprise sensors and algorithms to determine the current yaw rate and estimate the current side slip angle. It determines the direction of motion B at the wheel contact point C of the respective wheel R or the drift angle α of the wheel R, e.g., by measuring by means of a sensor 23a and/or by computing. The drift angle reduction device 18 can comprise a control algorithm and hardware that adjusts the steering angle βZA of the additional axle ZA in order to reduce the drift angle αZA of the additional axle wheels RZA relative to their respective direction of motion BZA. The respective drift angle αZA is especially reduced if the direction of travel deviation detector 20, which can comprise algorithms that determine the current driving state (understeering, neutral, oversteering) and its intensity, determines strong understeer or strong oversteer, wherein a strong understeer is understeer in excess of a defined understeer limit value $G_{under}$ and a strong oversteer is oversteer greater than a defined oversteer limit value $G_{over}$. The braking intervention device 22 enables a braking intervention on the additional axle ZA or on the left additional axle wheel RZAL and/or on the right additional axle wheel RZAR at the same time as the reduction of the drift angle αZA by the drift angle reduction device 18.

Departing from the described exemplary embodiment, the tilt stability control device 6 can also be omitted, possibly together with the brake operating device 14, so that the method described below for FIG. 5 can be carried out by means of the drive stabilization device 1, but not the method described below for FIG. 4. According to another alternative exemplary embodiment, the yaw regulation control device 7 can be omitted instead, possibly together with the braking intervention device 22, so that the method according to FIG. 4 can be performed by means of the drive stabilization device 1, but not the method according to FIG. 5. Either the tilt stability control device 6 or the yaw regulation control device 7 may not be omitted without a replacement, but can be replaced by a device for tilt stability control or yaw control of a different type of design, especially a conventional design.

Figure 4:
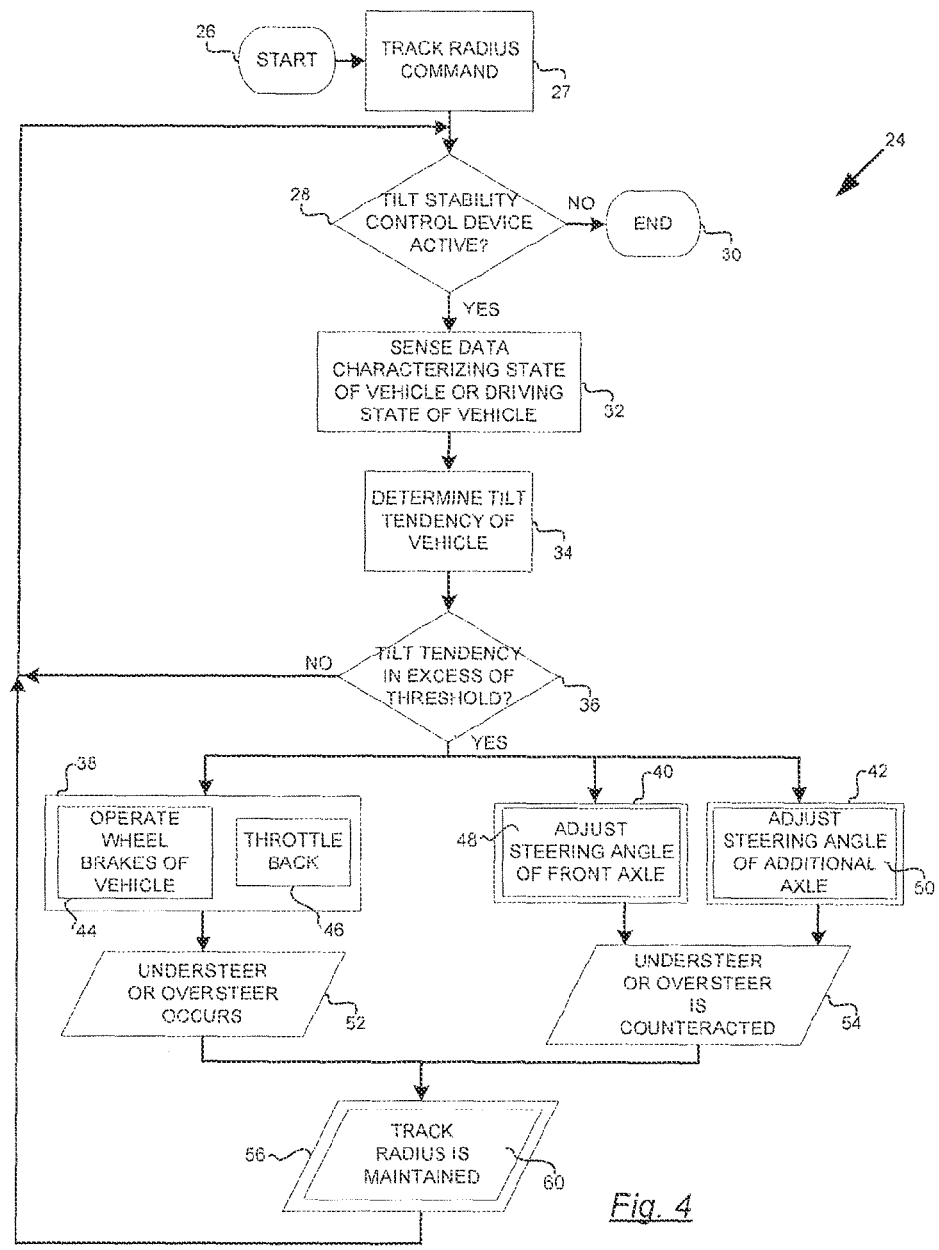
FIG. 4 is a flow chart illustrating the drive stabilization method according to a first exemplary embodiment of the invention.
Figure 5:
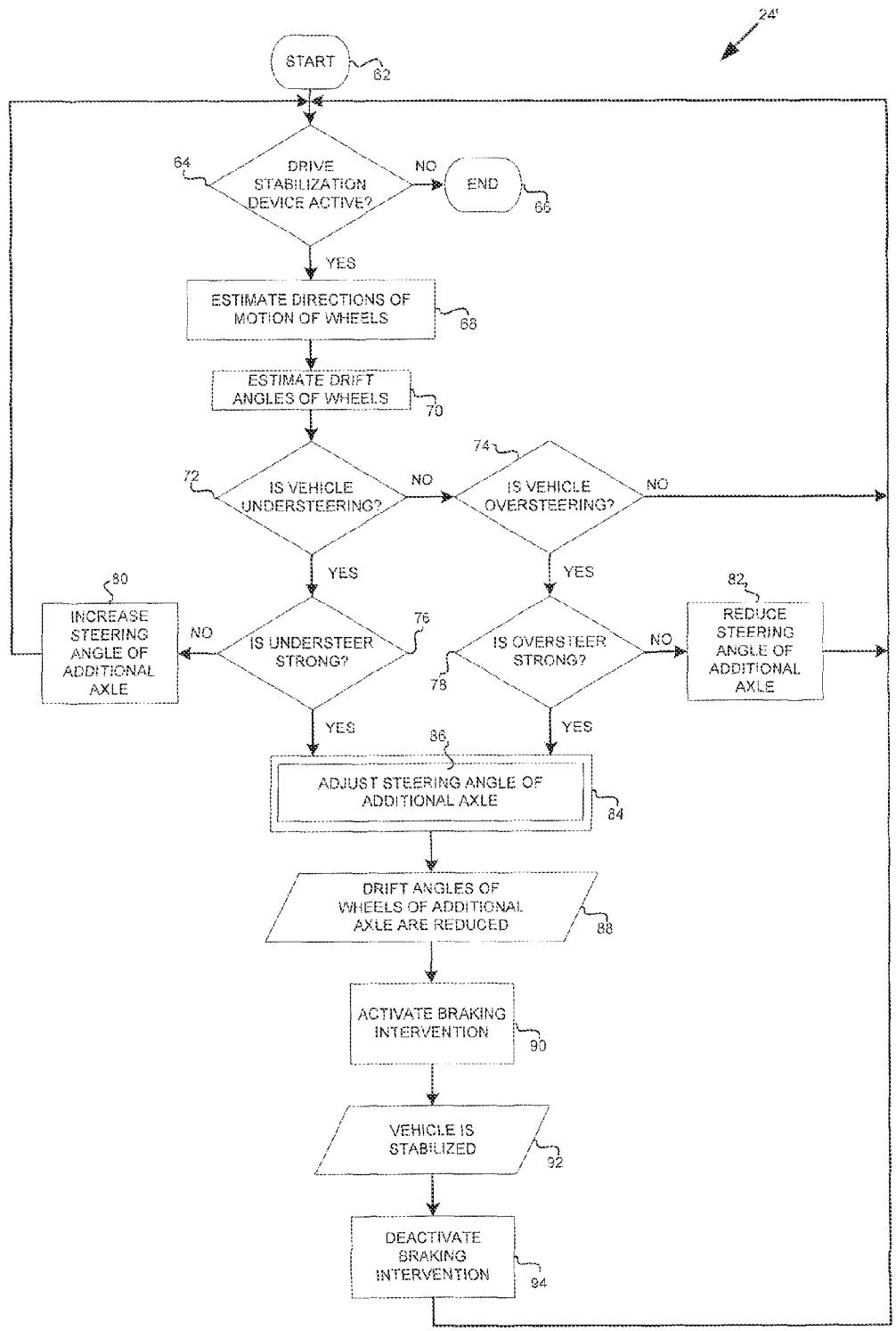
FIG. 5 is a flow chart illustrating the drive stabilization method according to a second exemplary embodiment of the invention.

FIGS. 4 and 5 illustrate a first drive stabilization method 24 according to a first exemplary embodiment of the invention and a second drive stabilization method 24' according to a second exemplary embodiment of the invention, respectively. Preferably, the steps of the method illustrated in FIGS. 4 and 5 are parts of a common drive stabilization method 24 or 24', wherein overall the drive stability of the vehicle 2 is improved by means of all of the method steps.

The drive stabilization method 24 according to FIG. 4 starts at a step 26. The track radius 5 is specified by a driver of the vehicle 2 with a command 27 by means of the steering wheel 3. Subsequent steps of the method only occur if the tilt stability control device 6 is active, which is illustrated by a query 28 as to whether this is the case. Otherwise, the end of the drive stabilization method 24 is reached according to a step 30 as shown.

At least if the tilt stability control device 6 is active according to the query 28, data are determined or sensed according to a step 32 that characterize the current state of the vehicle or drive state of the vehicle 2. Subsequently, the tilt stability control device 6 determines the current tilt inclination or roil of the vehicle 2 according to a step 34 by means of the data determined in step 32. The tilt stability control device 6 can thereby be a so-called Roll Stability Control (RSC) device. In particular, the tilt stability control device 6 uses data such as the speed of the vehicle 2, the steering angle βVA, βZA on the front axle VA or rear axle ZA, data of a yaw rate sensor and possibly other acceleration sensors and/or data from axle load sensors for determining the current tilt inclination.

With a relatively low determined tilt inclination, following a query 36, the method proceeds with the query 28. If, however, according to the query 36 it is determined that the determined tilt inclination exceeds the tilt limit angle $G_{tilt}$, the method proceeds in parallel with steps 38, 40 and 42. According to step 38, a deceleration of the vehicle is performed or caused. In particular, according to step 44 a plurality of or preferably all wheel brakes 23 of the vehicle 2 are operated or a brake pressure increase takes place. Furthermore, according to step 46 throttling back occurs or the speed demand or acceleration demand specified by the driver by means of a gas pedal is manipulated such that a lower speed of the vehicle or a deceleration of the vehicle 2 compared to the demand is adjusted.

According to step 40, the steering angle βVA on the front axle VA is changed. In particular, according to step 48, when the wheel brakes 23 are operated in response to the detected tilt inclination, a changed steering angle αVA is adjusted, especially relative to the steering angle βVA demanded by the driver or even manipulated by means of other systems. An additional steering angle is thereby electronically adjusted on the front axle VA or on both wheels RVAL and RVAR of the front axle VA. A steering rod of the vehicle 2 can be designed such that a different steering angle β or additional steering angle may be adjusted on the left side of the vehicle 2 than on the right side of the vehicle 2 so that the extensions TVA of the wheels RVA intersect at the common central point Z and identical or similar drift angles αVA thus occur on the two wheels RVA of the front axle VA.

The steering angle β is adjusted depending on a determined or predicted change of the track radius 5 of the vehicle 2, especially depending on the yaw rate in combination with the speed of the vehicle 2 or the change of the yaw rate and the speed. The steering angle β thus depends indirectly on the deceleration of the vehicle caused or demanded by means of the tilt stability control device 6.

According to step 42, the steering angle βZA on the additional axle ZA is changed, in particular according to a step 50 a changed steering angle βZA is adjusted. Alternatively to the exemplary embodiment shown, either step 40 with step 48 or step 42 with step 50 can also be omitted. Step 40 can especially be omitted if the additional axle ZA but not the front axle VA is electronically or automatically forcibly steerable. Step 42 can alternatively especially be omitted if the front axle VA but not the additional axle ZA is electronically or automatically forcibly steerable.

Carrying out the deceleration of the vehicle according to step 38 has an effect on the vehicle 2 causing understeer or oversteer according to a step 52. According to a step 54, the changed steering angles αVA or αZA on the front axle VA or on the additional axle ZA of the vehicle 2 counteract the influence that causes understeer or oversteer according to step 52. The steering angle αVA and αZA, e.g., are adjusted depending on the determined braking effect or on a brake pressure increase, especially caused by the tilt stability control device 6, for deceleration of the vehicle 2. Overall, it thus follows from steps 52 and 54 that the vehicle is stabilized according to a step 56 or remains stabilized. In particular, according to a step 60 the track radius 5 on which the vehicle 2 is moving is essentially maintained. The yaw rate thereby reduces because of the reducing speed of the vehicle. Query 28 is again carried out.

In further phases the steering angle α is only further increased or reduced if a greater tendency to understeer or tendency to oversteer or a further increased braking pressure is determined or predicted. If, on the other hand, a lower tendency to understeer or tendency to oversteer or a further reduced braking pressure is determined or predicted, then, by contrast, a less markedly changed manipulated steering angle αVA or αZA is adjusted. In particular, if it is determined according to query 36 that the tilt inclination is not in excess of the tilt limit angle, the respective steering angle β specified by the driver's demand or the longitudinal direction A of the wheels R specified by the driver's demand is set again.

FIG. 5 shows the second drive stabilization method 24', which starts in a step 62 and ends after a query 64 if the drive stabilization device 1 is not active. If, however, the drive stabilization device 1 is active according to query 64, then according to a step 68 the directions of movement B of the wheels R at their respective wheel contact points C are determined. The determination is thereby a measurement, especially sensing by means of the sensor 23a or a plurality of sensors or computation using set variables, such as a steering angle specified by the driver, and using sensed data, such as the speed of the vehicle or the wheel revolution rates and/or the yaw rate and/or lateral acceleration of the vehicle 2. Using the respective determined direction of motion B, the drift angle α of each of the wheels R is preferably determined in a step 70. Queries 72 and 74 as to whether the vehicle 2 is understeering or oversteering are carried out. The understeer or oversteer is also determined by means of sensed data, especially the yaw rate and possibly other data. Queries 72 and 74 can thereby also be exchanged for each other.

If the vehicle 2 is neither understeering nor oversteering, the method continues with query 64. Otherwise, a distinction is made according to a query 76 or 78 as to whether or not the vehicle 2 is strongly understeering or oversteering. In particular, the deviation of the actual course of the vehicle 2 from a course specified by the driver by means of the steering wheel 3, or the deviation of the actual track radius 5 from the specified track radius 5 is determined and is compared with the understeer limit value $G_{under}$ and/or with the oversteer limit value $G_{over}$. In the case of relatively slight understeer according to query 76, a greater steering angle αZA is adjusted on the additional axle ZA according to a step 80. Accordingly, in the case of relatively slight oversteer according to query 78, a reduced steering turn-in or steering angle αZA on the additional axle ZA is adjusted in a step 82. The steering angle αZA is thereby especially to be understood as larger or smaller relative to the steering angle αZA that is adjusted on the additional axle ZA according to FIG. 1 in accordance with the steering angle αVA on the front axle VA.

If, however, a strong understeer or strong oversteer is determined, the steering angle βZA of the additional axle ZA is changed according to a step 84, wherein, according to a step 86, the steering angle βZA is adjusted according to the respective direction of motion BZA of the respective wheel RZA on the additional axle ZA. According to a step 88, the drift angle αZA on the wheels RZA of the additional axle ZA is thereby reduced or a reduced drift angle αZA is set. Preferably, the drift angle αZA is thereby essentially reduced to 0 in order to enable relatively high braking forces to be transferred subsequently. In particular, with strong oversteer, the drift angle αZA may not be able to be returned to 0 because a maximum steering angle βZA on the additional axle ZA has previously been reached. In this case, the maximum possible steering angle βZA on the additional axle ZA is adjusted and the drift angle αZA on the additional axle ZA is thereby reduced as much as possible.

Subsequently, according to a step 90 a braking intervention can be activated, especially on the wheels RZA of the additional axle ZA. which, because of the minimized drift angle αZA, effectively counteracts another lateral breakaway of the rear of the vehicle or sliding of the vehicle 2 via its front axle VA. The vehicle 2 is thus stabilized according to a step 92. Subsequently, the braking intervention can be deactivated again according to a step 94. Query 64 is again carried out.

Figure 6:
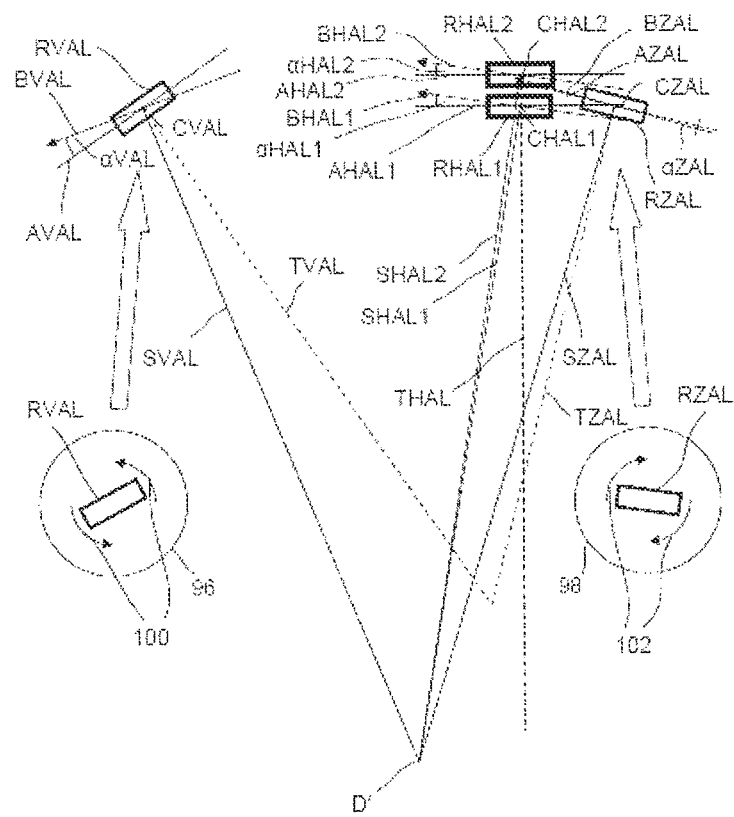
FIG. 6 shows the wheels on the left side of the vehicle similar to FIG. 2, but with increased steering angle on the front axle and additional axle during a braking intervention caused by a tilt stability control device.

FIG. 6 shows the wheels RVAL, RHAL1, RHAL2 and RZAL on the left side of the vehicle 2 similar to FIG. 2, but with increased steering angle βVA, βZA. on the front axle VA and on the additional axle ZA compared to FIG. 2 or compared to a driver's demand specified by means of a steering angle of the steering wheel 3. The increased steering angle βVA, βZA is used to compensate for a tendency to understeer during a braking intervention that is caused by the tilt stability control device 6.

The wheels RVAL and RZAL with their respective longitudinal direction AVAL or AZAL according to FIG. 2 are shown in circles 96 and 98 for comparison. In addition, arrows 100 are shown in circle 96, which illustrate that the left front wheel RVAL, starting from the illustration according to FIG. 2 or in the circle 96, is rotating anticlockwise and is thereby turned in more in order to move to the illustration according to FIG. 6 (top). Correspondingly, arrows 102 in circle 98 illustrate clockwise rotation or a further turn-in of the additional axle wheel RZAL in the illustration according to FIG. 6 (top) compared to the illustration according to FIG. 2 or in circle 98. The axes of rotation of the wheels R, as shown in FIG. 6, do not necessarily have to intersect at a common point. The point of rotation D1' is, however, unchanged compared to the illustration according to FIG. 2 or is at the same distance from the vehicle 2, so that despite the braking intervention by the wheels RVA and RZA that are turned in further, no understeer occurs or the vehicle 2 is stabilized on its desired track radius 5. The drift angles α are thereby changed compared to the illustration in FIG. 2.

Figure 7:
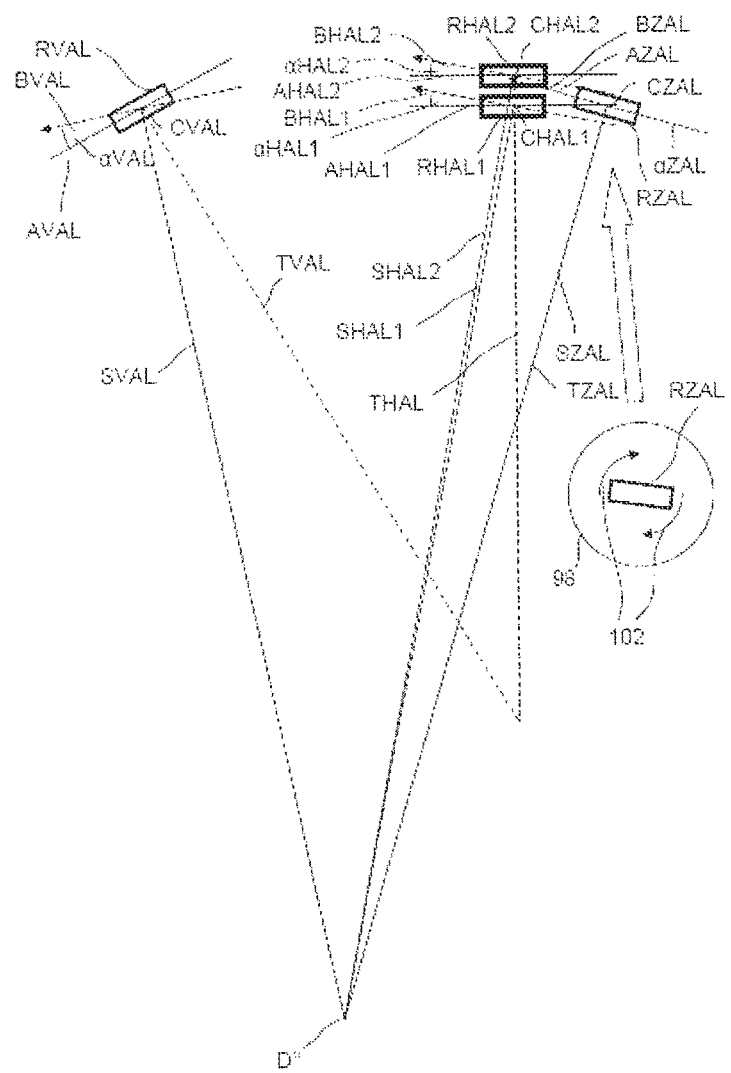
FIG. 7 shows the wheels on the left side of the vehicle similar to FIG. 2, but with reduced drift angle on the additional axle with strong understeer of the vehicle.
Figure 8:
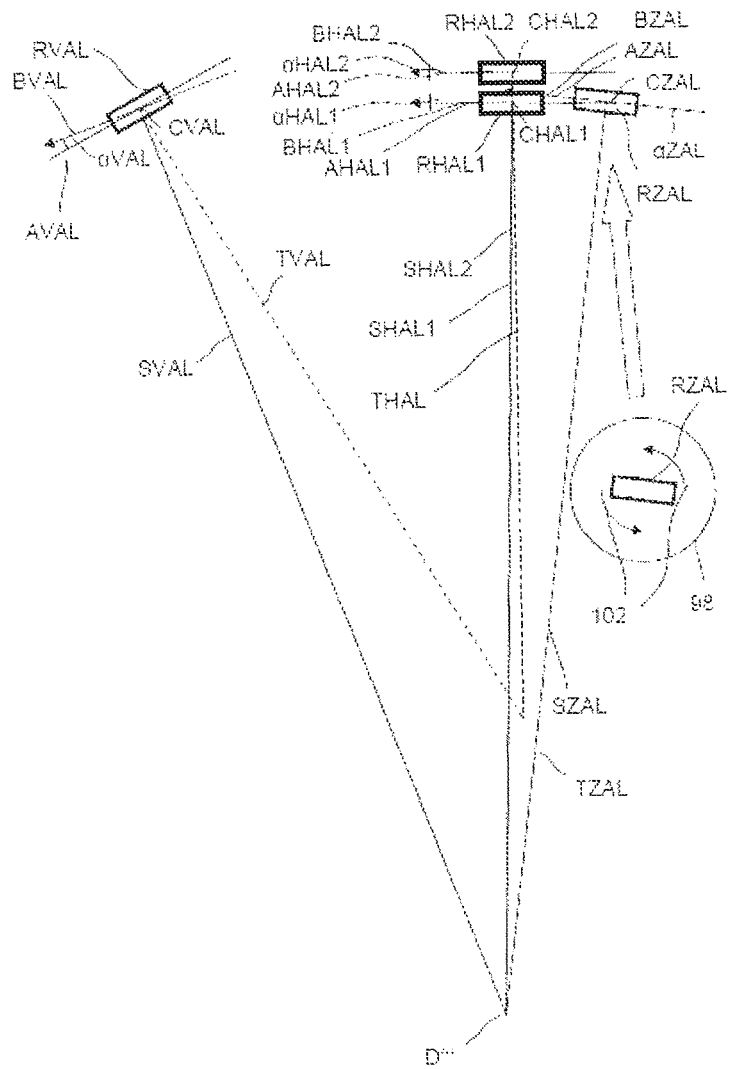
FIG. 8 shows the wheels on the left side of the vehicle similar to FIG. 2, but with reduced drift angle on the additional axle with strong understeer of the vehicle in a different manner compared to FIG. 7.
Figure 9:
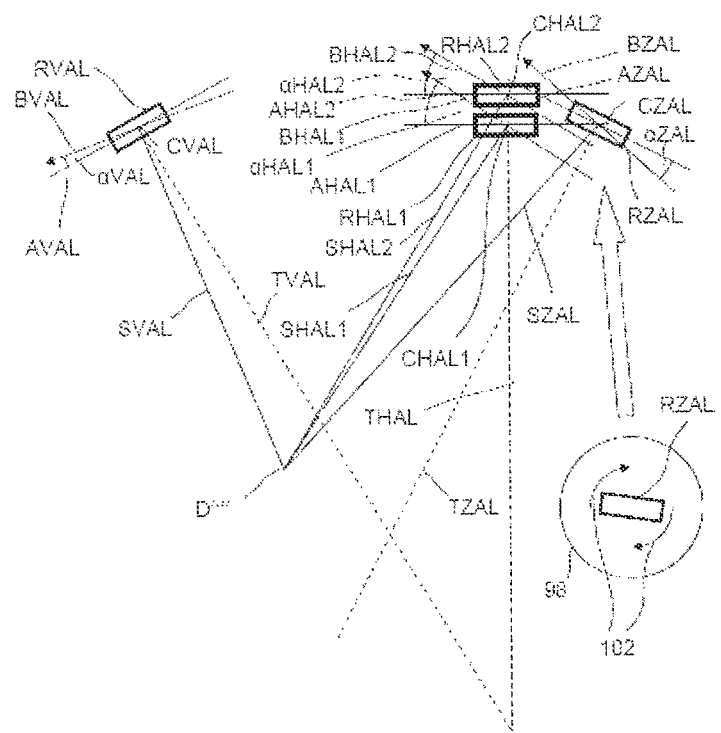
FIG. 9 shows the wheels on the left side of the vehicle similar to FIG. 2, but with reduced drift angle on the additional axle with strong oversteer of the vehicle.

FIG. 7, FIG. 8 and FIG. 9 likewise show wheels RVAL, RHAL1, RHAL2 and RZAL on the left side of the vehicle 2, wherein the left front wheel RVAL and the wheels RHAL1 and RHAL2 of the rear axle HA have their respective longitudinal directions AVAL, AHAL1 or AHAL2 according to FIG. 2. The longitudinal direction AZAL on the additional axle ZA is, however, changed compared to the illustration according to FIG. 2 in order to achieve a very small drift angle αZAL on the additional axle ZA and thus to be able to apply advantageous braking force to the road or in order to achieve a greater braking effect compared to the braking effect for the larger drift angle α without the invention.

FIG. 7 shows a situation with strong understeer of the vehicle 2. In particular, a point of rotation D" is displaced compared to the point of rotation D' according to FIG. 2 such that the lines S between the wheel contact points C and the point of rotation D" are lengthened and thus a greater track radius 5 of the vehicle 2 is set. The additional axle ZA is turned in further compared to the illustration according to FIG. 2, so that the direction of motion BZA essentially coincides with the longitudinal direction AZA.

FIG. 8 shows another example of understeer of the vehicle 2, wherein, however, an axis of rotation D''' is displaced compared to the axis of rotation D'' of FIG. 7 such that, in this case, a reduction of the steering angle on the additional axle ZA or a rotation of the wheel RZAL in the opposite rotation direction compared to FIG. 7 leads to a reduction of the drift angle αZAL.

FIG. 9 shows by way of example the situation for strong oversteer of the vehicle 2, wherein a point of rotation D'''' is much closer to the vehicle 2 compared to the illustration according to FIG. 2. Compared to FIG. 2, the additional axle ZA is thereby turned in further or the steering angle βZA is increased in order to reduce the drift angle αZA. However, the drift angle αZA cannot be returned to 0 in this case because, for this, the additional axle wheel RZAL would have to be turned in still further than illustrated in FIG. 9, but its maximum turn-in has already been reached. Nevertheless, another breakaway of the rear of the vehicle can advantageously be counteracted or the vehicle 2 can be returned to its provided track by braking on the additional axle ZA.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A vehicle stabilization method, in which at least one of a steering angle of at least one steerable front axle of a vehicle and a steering angle of at least one steerable additional axle of the vehicle is changed relative to a longitudinal axis of the vehicle by automatic forced steering of the at least one steerable front axle and the at least one steerable additional axle, the method comprising:
   a) when a tilt tendency of the vehicle is detected by a tilt stability control device as being greater than a tilt limit angle, decelerating the vehicle to reduce the tilt tendency, and using a track keeping device to adjust at least one of (i) a changed steering angle of the at least one steerable front axle and (ii) a changed steering angle of the at least one steerable additional axle to counteract one of understeering and oversteering of the vehicle resulting from decelerating the vehicle; and
   b) determining a direction of motion at a wheel contact point of at least one additional axle wheel disposed on the at least one steerable additional axle relative to the longitudinal axis of the vehicle, adjusting the steering angle of the at least one steerable additional axle based on the direction of motion to reduce a drift angle of the at least one additional axle wheel relative to the direction of motion, determining whether there is one of understeering of the vehicle in excess of a preselected understeer limit value, and oversteering of the vehicle in excess of a preselected oversteer limit value, and effecting at least one braking intervention on the at least one additional axle wheel of the at least one steerable additional axle when one of understeering of the vehicle in excess of the understeer limit value and oversteering of the vehicle in excess of the oversteer limit value is determined.

2. The stabilization method as claimed in claim 1, wherein a track radius of the vehicle about a point of rotation corresponds to a steering angle demand by a steering wheel of the vehicle even during decelerating of the vehicle and adjusting of at least one of the changed steering angle of the at least one steerable front axle and the changed steering angle of the at least one steerable additional axle.

3. The stabilization method as claimed in claim 1, wherein decelerating the vehicle includes operating at least one wheel brake of the vehicle.

4. The stabilization method as claimed in claim 1, wherein adjusting the steering angle of the at least one steerable additional axle is effected only when one of understeering of the vehicle in excess of the understeer limit value and oversteering of the vehicle in excess of the oversteer limit value is determined.

5. A vehicle stabilization device for stabilizing a vehicle by changing at least one of a steering angle of at least one steerable front axle of the vehicle and a steering angle of at least one steerable additional axle of the vehicle relative to a longitudinal axis of the vehicle by automatic forced steering of the at least one steerable front axle and the at least one steerable additional axle, the device comprising:
   a) a track keeping device configured to adjust at least one of (i) a changed steering angle of the at least one steerable front axle and (ii) a changed steering angle of the at least one steerable additional axle to counteract one of understeering and oversteering of the vehicle resulting from decelerating the vehicle to reduce a tilt tendency of the vehicle detected by a tilt stability control device as being greater than a tilt limit angle; and
   b) an estimation device configured to determine a direction of motion at a wheel contact point of at least one additional axle wheel disposed on the at least one steerable additional axle relative to the longitudinal axis of the vehicle, a drift angle reduction device configured to adjust the steering angle of the at least one steerable additional axle based on the direction of motion to reduce a drift angle of the at least one additional axle wheel relative to the direction of motion, a direction of travel deviation detector configured to detect understeering of the vehicle greater than a preselected understeer limit value and oversteering of the vehicle greater than a preselected oversteer limit value, and a braking intervention device configured to activate at least one braking intervention on the at least one additional axle wheel of the at least one steerable additional axle when there is one of understeering of the vehicle greater than the understeer limit value and oversteering of the vehicle greater than the oversteer limit value.

6. The stabilization device as claimed in claim 5, wherein the track keeping device is configured such that a track radius of the vehicle about a point of rotation corresponds to a steering angle demand by a steering wheel of the vehicle even during deceleration of the vehicle and adjustment of at least one of the changed steering angle of the at least one steerable front axle and the changed steering angle of the at least one steerable additional angle.

7. The stabilization device as claimed in claim 5, further comprising a brake operating device configured to operate at least one wheel brake of the vehicle to decelerate the vehicle.

8. The stabilization device as claimed in claim 5, wherein the drift angle reduction device is configured such that the steering angle of the at least one steerable additional axle is adjusted only when there is one of understeering of the vehicle greater than the understeer limit value and oversteering of the vehicle greater than the oversteer limit value.

9. A vehicle stabilization device configured to effect a vehicle stabilization method in which at least one of a steering angle of at least one steerable front axle of a vehicle and a steering angle of at least one steerable additional axle of the vehicle relative to a longitudinal axis of the vehicle is changed by automatic forced steering of the at least one steerable front axle and the at least one steerable additional axle, the method comprising:
  a) when a tilt tendency of the vehicle is detected by a tilt stability control device as being greater than a tilt limit angle, decelerating the vehicle to reduce the tilt tendency, and adjusting at least one of (i) a changed steering angle of the at least one steerable front axle and (ii) a changed steering angle of the at least one steerable additional axle to counteract one of understeering and oversteering of the vehicle resulting from decelerating the vehicle; and
  b) determining a direction of motion at a wheel contact point of at least one additional axle wheel disposed on the at least one steerable additional axle relative to the longitudinal axis of the vehicle, adjusting the steering angle of the at least one steerable additional axle based on the direction of motion to reduce a drift angle of the at least one additional axle wheel relative to the direction of motion, determining whether there is one of understeering of the vehicle in excess of a preselected understeer limit value and oversteering of the vehicle in excess of a preselected oversteer limit value, and effecting at least one braking intervention on the at least one additional axle wheel of the at least one steerable additional axle when one of understeering of the vehicle in excess of the understeer limit value and oversteering of the vehicle in excess of the oversteer limit value is determined.

10. A vehicle, comprising at least one steerable front axle; at least one steerable additional axle; and a vehicle stabilization device for stabilizing the vehicle by changing at least one of a steering angle of the at least one steerable front axle and a steering angle of the at least one steerable additional axle of the vehicle relative to a longitudinal axis of the vehicle by automatic forced steering of the at least one steerable front axle and the at least one steerable additional axle, the device comprising:
  a track keeping device configured to adjust at least one of (i) a changed steering angle of the at least one steerable front axle and (ii) a changed steering angle of the at least one steerable additional axle to counteract one of understeering and oversteering of the vehicle resulting from decelerating the vehicle to reduce a tilt tendency of the vehicle detected by a tilt stability control device as being greater than a tilt limit angle;
  an estimation device configured to determine a direction of motion at a wheel contact point of at least one additional axle wheel disposed on the at least one steerable additional axle relative to the longitudinal axis of the vehicle;
  a drift angle reduction device configured to adjust the steering angle of the at least one steerable additional axle based on the direction of motion to reduce a drift angle of the at least one additional axle wheel relative to the direction of motion;
  a direction of travel deviation detector configured to detect understeering of the vehicle greater than a preselected understeer limit value and oversteering of the vehicle greater than a preselected oversteer limit value; and
  a braking intervention device configured to activate at least one braking intervention on the at least one additional axle wheel of the at least one steerable additional axle when there is one of understeering of the vehicle greater than the understeer limit value and oversteering of the vehicle greater than the oversteer limit value.

* * * * *